US011094080B2

(12) United States Patent
Schiebener et al.

(10) Patent No.: US 11,094,080 B2
(45) Date of Patent: Aug. 17, 2021

(54) METHOD AND DEVICE FOR DETERMINING WHETHER A HAND COOPERATES WITH A MANUAL STEERING ELEMENT OF A VEHICLE

(71) Applicant: APTIV TECHNOLOGIES LIMITED, St. Michael (BB)

(72) Inventors: David Schiebener, Mettmann (DE); Alexander Barth, Wermelskirchen (DE)

(73) Assignee: Aptiv Technologies Limited, St. Michael (BB)

( * ) Notice: Subject to any disclaimer, the term of this patent is extended or adjusted under 35 U.S.C. 154(b) by 0 days.

(21) Appl. No.: 16/828,212

(22) Filed: Mar. 24, 2020

(65) Prior Publication Data

US 2020/0320737 A1 Oct. 8, 2020

(30) Foreign Application Priority Data

Apr. 4, 2019 (EP) .................................... 19167436

(51) Int. Cl.
G06T 7/73 (2017.01)
B60R 11/04 (2006.01)
B62D 1/04 (2006.01)

(52) U.S. Cl.
CPC ................ G06T 7/74 (2017.01); B60R 11/04 (2013.01); B62D 1/04 (2013.01)

(58) Field of Classification Search
CPC ...... B60R 11/04; B62D 1/04; G06K 9/00201; G06K 9/00375; G06K 9/00832;
(Continued)

(56) References Cited

U.S. PATENT DOCUMENTS 7,019,623 B2 3/2006 Klausner et al.
2006/0285723 A1* 12/2006 Morellas ................. G06T 7/246
382/103
(Continued)

FOREIGN PATENT DOCUMENTS

DE 102014225680 6/2016
DE 102018001970 9/2019
WO 2018113857 6/2018

OTHER PUBLICATIONS

Cheng et al., (Multi-spectral and Multi-perspective Video Arrays for Driver Body Tracking and Activity Analysis; Computer Vision and Image Understanding, May 4, 2007 Academic Press, US; Pub: 2007; vol. 106, Nr: 2-3, pp. 245-257; URL: http://cvrr.ucsd.edu/publications/2007/SCheng_CVIU07.pdf.) (Year: 2007).*

(Continued)

*Primary Examiner* — Peet Dhillon
(74) *Attorney, Agent, or Firm* — Colby Nipper PLLC (57) ABSTRACT

A computer-implemented method for determining an information on whether at least one hand of a vehicle driver cooperates with a manual steering element of a vehicle, wherein the method comprises: taking at least one image by means of at least one sensor mounted on the vehicle, wherein the at least one image captures at least a manual steering element of the vehicle; and determining, on the basis of the at least one image, an information on whether at least one hand of a vehicle driver cooperates with the manual steering element.

20 Claims, 5 Drawing Sheets

(58) Field of Classification Search
CPC .. G06K 9/00845; G06K 9/342; G06K 9/6218; G06K 9/6268; G06K 9/6271; G06N 3/0454; G06N 3/08; G06T 7/74
See application file for complete search history.

(56) References Cited

U.S. PATENT DOCUMENTS

| | | | |
|---|---|---|---|
| 2011/0133919 | A1 | 6/2011 | Evarts et al. |
| 2012/0283894 | A1 | 11/2012 | Naboulsi |
| 2017/0304732 | A1* | 10/2017 | Velic .................... G06K 9/6255 |
| 2018/0046255 | A1* | 2/2018 | Rothera ................ B60K 35/00 |
| 2018/0365533 | A1 | 12/2018 | Sathyanarayana et al. |
| 2019/0092346 | A1 | 3/2019 | Odate et al. |
| 2019/0187701 | A1 | 6/2019 | Zheng et al. |
| 2019/0299996 | A1 | 10/2019 | Hagen et al. |
| 2020/0231109 | A1* | 7/2020 | Baitaxe ................ G05D 1/0088 |
| 2021/0078609 | A1 | 3/2021 | Barth et al. |

OTHER PUBLICATIONS

Extended European Search Report for Application No. EP 19167436 dated Oct. 10, 2019.

Cheng et al: "Multi-spectral and multi-perspective video arrays for driver body tracking and activity analysis," Computer Vision and Image Understanding, Academic Press, U.S., vol. 106, No. 2-3, May 4, 2007, pp. 245-257, XP022077231, ISSN: 1077-3142.

"Extended European Search Report", EP Application No. 19197824.6, Apr. 2, 2020, 8 pages.

Amortila, et al., "Positioning Study of Driver's Hands in Certain Areas of the Steering Wheel", Jan. 2018, 6 pages.

Borghi, et al., "Hands on the wheel: A Dataset for Driver Hand Detection and Tracking", May 2018, 8 pages.

Cucchiara, et al., "Camera-car Video Analysis for Steering Wheel's Tracking", Apr. 2003, pp. 36-43, 8 pages.

Le, "Multiple Scale Faster-RCNN Approach to Driver's Cell-Phone Usage and Hands on Steering Wheel Detection", Jun. 2016, pp. 46-53, 8 pages.

Le, et al., "Robust Hand Detection and Classification in Vehicles and in the Wild", Jul. 2017, pp. 39-46, 8 pages.

Le, et al., "Robust Hand Detection in Vehicles", Dec. 2016, pp. 562-567, 6 pages.

Rangesh, et al., "Driver hand localization and grasp analysis: A vision-based real-time approach", Nov. 2016, 6 pages.

Tran, et al., "Driver assistance for "Keeping Hands on the Wheel and Eyes on the Road—", Dec. 2009, 6 pages.

Zhou, et al., "Hierarchical Context-Aware Hand Detection Algorithm for Naturalistic Driving", Nov. 2016, 6 pages.

* cited by examiner

METHOD AND DEVICE FOR DETERMINING WHETHER A HAND COOPERATES WITH A MANUAL STEERING ELEMENT OF A VEHICLE

CROSS REFERENCE TO RELATED APPLICATIONS

This application claims priority to European Patent Application No. 19167436.5, filed on Apr. 4, 2019.

FIELD

The invention relates to a method for determining an information on whether at least one hand of a vehicle driver cooperates with a manual steering element of a vehicle.

BACKGROUND

In the context of vehicle automation and Advanced Driver Assistance Systems (ADAS), the knowledge of whether the hands of a driver are on a steering element, e.g. the steering wheel, is an essential information on the availability of the driver. For example, having the hands on the wheel is a strong indicator that the driver is in control of the vehicle or can gain control within a short amount of time.

There are several solutions in the market based on sensors inside the steering wheel (e.g. capacitive sensors or torque sensors). Such systems are able to detect human hands touching the steering wheel or the force a human hand applies to the wheel, but they can also be misled by other objects or body parts.

There is a need for improved detection of hands cooperating with a steering element of a vehicle.

SUMMARY

Vehicles can now be equipped with cameras for driver monitoring or gesture control. Such cameras can be utilized for the task of hands-on-steering-wheel detection or in general for hands-on-steering-element detection. This is to say that the camera can be used to determine whether a hand of the vehicle driver cooperates with a steering element (e.g. a steering wheel or the like). When a hand cooperates with the element, the hand can at least partially be in physical contact with a portion of the steering element. It is also possible that the hand is located in close proximity to a portion of the steering element. The portion of the steering element can be predetermined, for example the outer ring of a steering wheel and/or a strut inside the ring.

In general, a state in which the at least one hand cooperates with the steering element comprises that the at least one hand touches the steering element and/or is in close proximity to the steering element, wherein "close proximity" means that the distance between the hand and the steering element is assumed to be below a threshold. Said state can also comprise that the hand is assumed to operate the steering element or intents to operate the steering element.

According to one aspect a computer-implemented method is provided for determining an information on whether at least one hand of a vehicle driver cooperates with a manual steering element of a vehicle. The method comprises: taking at least one image by means of at least one sensor mounted on a vehicle, wherein the at least one image captures at least a manual steering element of the vehicle; and determining, on the basis of the at least one image, an information on whether at least one hand of a vehicle driver cooperates with the manual steering element. The steering element can be a steering wheel or the like. Other possible steering elements are gear levers and other control or actuation elements in the vehicle.

The method allows to reliably and quickly determine the desired information. An advantage is that the information is specifically related to the hand and not to other portions of the body. It is assumed that reliable control of a vehicle is only possible by means of at least one hand of the driver. As a consequence, the focus is on the hands. The method is thus capable of distinguishing hands from other body parts (e.g. legs, knees) or objects (e.g. soda can, water bottle, fruit, etc. can be in contact with the steering wheel). This is a strong advantage over capacitive sensor solutions arranged inside a steering wheel. In particular, classical touch sensors installed within the steering wheel will typically give false positive results when the wheel is in contact with the knees or other body parts, or objects like soda cans, fruits, books, newspapers, magazines, electronic devices such as laptops and smartphones, or other objects which can be typically present within a vehicle.

The method is based on processing one or more images. An image can be formed by an ensemble of pixels, each pixel having at least one pixel value. The pixels can correspond to photosensitive elements, but they are not restricted thereto.

In an embodiment the at least one image comprises three-dimensional (3D) image data. The at least one sensor can thus comprise for example a structured light camera, a time-of-flight camera, an ultrasonic sensor, a radar sensor and/or a Lidar sensor. Other sensors for acquiring three-dimensional image data can also be used, in particular multiple sensors, e.g. a stereoscopic sensor pair.

3D-image data comprising, e.g., amplitude (i.e. light intensity) and/or depth (i.e. distance) information allows for a great improvement of the reliability with respect to obtaining the desired information, which can be for example a likelihood, e.g., a probability value indicating the probability that the at least one hand cooperates with the steering element. The information can be provided as a variable having a defined scale, e.g., between zero and one which simplifies further processing of the variable.

The variable can also be discrete or even binary, i.e. the variable can only take on two different values, e.g., zero and one.

The information can be provided to a processing unit of the vehicle, where the information can be processed in order to enable safe automatic vehicle applications (e.g. Advanced Driver Assistance Systems), in particular an autonomous driving application.

In general, the methods disclosed herein represent a visual approach, which makes it possible to distinguish between an actual grasp of the steering element and a minimal contact of the steering element with a fingertip. Therefore, said information can comprise classification data about the spatial relationship between the hand and the steering element. In particular, a hand-pose classification can be provided.

Moreover, statistical information can be provided, as will become more apparent in the following.

In contrast to sensors mounted on a steering element and which therefore require a physical contact to the steering wheel for their activation, a vision-based approach can be configured in way that an output signal is generated when one or more hands are in close proximity to the steering element, which allows for grabbing the steering element in a very short amount of time, e.g., less than half a second.

Therefore, a state in which a hand is in close proximity to the steering element and/or ready to grab the steering element can also be a type of cooperation with the steering element. However, it may alternatively be provided that only a grasp of the steering element is detected as a cooperation with the steering element.

It can be provided that detecting only one of the hands is sufficient for determining the desired information. However it can also be provided that both hands are monitored by means of the method. Monitoring both hands can raise the overall reliability of the information. For example, the information can comprise an information on whether only one hand or both hands cooperate with the steering element.

In an embodiment the method further comprises the following steps: detecting the steering element within the image; detecting the at least one hand within the image (when the at least one hand is contained in the image); determining a distance between the detected steering element and the detected at least one hand; and determining a first likelihood value on the basis of the distance, the first likelihood value indicating whether the at least one hand cooperates with the steering element, wherein the information is determined in dependence of or formed by the first likelihood value. The likelihood value can represent a probability of whether the at least one hand cooperates with the steering element. The detection of the specific portions within the image can be performed by means of one or more detection algorithms known from the field of image processing. The detection within the image represents a localization of the respective objects, i.e. the at least one hand and the steering element. A specific type of detection is described in the following.

In another embodiment the detected steering element is represented by a model of the steering element, the model having a position and/or an orientation matching with the position and/or orientation of the steering element in the vehicle, wherein the position and/or orientation of the model are determined by means of a matching algorithm. The matching algorithm can be configured as an evolutionary algorithm, in particular a particle filter, which can be parameterized with simulated annealing. Alternatively or in addition, a grid-search algorithm can be employed, i.e. the position and/or orientation of the model are determined by evaluating a cost function at predetermined samples in a predetermined search space. The use of regression algorithms is another alternative.

The matching algorithm can comprise the following: generating a plurality of sample points for the model, each of the sample points having a spatial position; determining, for at least some of the sample points, a plurality of sample pixels of the at least one image, each of the sample pixels having a respective pixel value of the at least one image; computing a rating function on the basis of the sample pixels, i.e. their pixel values; determining the matched model on the basis of the rating function. It is understood that the at least one image comprises a plurality of pixels, each of the pixels having a respective pixel value. The sample pixels are a subset of the totality of pixels that form the at least one image.

The model can comprise a geometrical model of the steering element. For example, the model or the outer shape of the model can be represented by a mathematical function, which is a very compact representation and therefore associated with a number of advantages. The model can also be represented by a limited number of points in order to reduce the complexity of the method.

When the steering element is formed by a steering wheel said model of the steering element can be for example a torus, in particular an elliptical torus. To estimate its 3D position and orientation (pose), possible locations can be sampled by regular-grid search and/or a particle-filter like approach. For each pose sample, the rating function can be calculated based on a specific portion of pixel values of the at least one image, these pixels can be selected on the basis of the generated sample points, as indicated further above. The rating function can generally represent the match between the model at the respective sample location and the image.

Having further regard to said generated sample points for identifying the sample pixel values, a first group of the sample points can be located on the geometrical model, and a second group of the sample points can be located outside the geometrical model, wherein difference pixel values can be computed between sample points of the first and second group. This can be done by subtracting pixel values of the sample pixels being associated with the sample points. In particular, each difference pixel value can be formed by subtracting a pixel value from the first group from a pixel value of the second group, wherein both pixel values are associated with a pair of sample pixels positioned on a line that extends in a radial direction or transversely with respect to the model. The rating function can be computed on the basis of the difference pixel values, which allows detecting the steering element with high accuracy.

In one example the values of the first group can be depth (i.e. distance) values of sample points located centrally on the model. In addition or alternatively, depth values of image points located on the outer edge of the model can be used. The values of the second group can be the depth values of the sample points located outside the model. The values of some points of the first group, for example the points located on the edges, can be gradients of the depth values, wherein these gradients result from processing the depth values by an edge detection filter, e.g. a Sobel edge filter. Exemplary algorithmic details are described further below.

According to one aspect the detected at least one hand is represented by a plurality of positions of the at least one hand, wherein the positions are associated with characteristic portions of the at least one hand. The positions can be three-dimensional positions which are determined on the basis of the image data. In one example characteristic hand points can be computed, e.g. on the basis of image statistics or by using models trained by way of machine learning. The positions can be formed by 3D points representing the center of the hand and one or more finger tips. The use of a limited number of positions reduces the amount of data for the detected hand and also allows for efficient extraction of information on the grabbing pose of the hand with respect to the steering element.

According to a further aspect detection of the at least one hand comprises: determining at least one hand region within the image by comparing the image with a reference image, wherein the hand region represents a portion of the image which is expected to contain the at least one hand; determining the at least one hand on the basis of the hand region by means of a classifier; determining the plurality of positions for the at least one hand.

In one example the hand is detected by a foreground-background segmentation step. The static background of the vehicle and the non-moving part of the driver can be represented by a background model (i.e. a reference image), which can be created at runtime. It can therefore consist of the static scene. At runtime, the image is compared to the background model and significant changes (e.g. signal above noise level) are identified. The foreground map can then be analyzed to create potential hand region candidates. A hand classification module can then be used to reject hand regions that do not contain a hand, e.g. by using a machine-learning based image classifier (for example a convolutional neural network or a cascaded classifier).

In another example a convolutional neural network can be trained to detect hand regions (e.g., as bounding boxes) on the basis of the at least one input image, wherein the image may comprise amplitude and/or depth information. Once a hand region has been detected by the neural network, 3D coordinates for characteristic hand points can be computed as indicated further above.

In yet another example, a convolutional neural network can be trained to detect the characteristic hand points directly from the input image. In one variant the neural network can be trained to provide a heat map output around the hand. From the heat map, which can generally comprise information on the spatial temperature probability distribution, characteristic 2D points can be derived, e.g. by fitting a Gaussian model or by weighted averaging of the heat map entries. This approach can include an initial clustering step as well as an outlier removal step. The depth coordinate can be derived from the 2D points and the underlying depth data if the image comprises such data.

If depth data is not directly acquired by the sensor, the depth data can be approximated on the basis of an assumed size of the hand.

In another example a deep neural network can be trained to perform a semantic segmentation of the input image, where preferably each pixel of the image will be assigned to a respective one of a plurality of classes having the maximum likelihood value, wherein at least one of the classes corresponds to a hand class. Segments of hand pixels can then be processed as described further above in connection with the foreground-background segmentation approach.

The step of determining the difference between the detected steering element and the detected at least one hand can comprise the following steps: determining a minimum distance between the detected at least one hand; and determining the first likelihood value in dependence of the minimum distance and a threshold.

The distance can be determined by a distance measure, for example Euclidean distance. Uncertainties of the steering wheel location and the hand positions can also be taken into account by using suitable distance measures (e.g., by using the Mahalanobis distance instead of Euclidean distance).

The minimum distance can be determined by first calculating the minimum distances between the points of the detected hand and the steering element and then selecting the minimum of these distances.

The minimum distance can be mapped to the likelihood value using a likelihood mapping function. The resulting values can be, for example, in the range of 0 and 1. With a minimum distance d between one or both hands and the steering element the likelihood value p can be calculated by the following formula $p=\max(0,1-d/(2t))$, wherein max( ) selects the maximum of the two arguments and t is a threshold for the maximum distance at which the hand is considered to cooperate with the steering element.

In a variant the minimum distance can be mapped to the likelihood value using a threshold function, e.g., the hand is considered to cooperate with the steering element if the minimum distance to the steering wheel is below a threshold.

According to a further aspect the method comprises: detecting the steering element within the image; determining a steering element portion of the image by cropping the image to a region of the detected steering element; determining a second likelihood value on the basis of the steering portion by means of a neural network, the second likelihood value indicating whether the at least one hand cooperates with the steering element, wherein the information is determined in dependence of the second likelihood value.

Said neural network for determining the second likelihood value can be a deep neural network trained on images being cropped to a steering element. The region of the detected steering element can capture the complete steering element as well as some configurable margin. The advantage of this is that the steering element is always at a similar position within the cropped image, which reduces the complexity of the data input to the neural network. In addition, the depth data of the cropped image can be normalized based on the 3D location of the steering element.

Instead of detecting the steering element as such it can be provided that a fixed image portion is cropped that is large enough to contain the steering element in all possible positions and/or orientations as well as a configurable margin of the steering element.

The method can further comprise the following steps: detecting the at least one hand within the image when the at least one hand is (at least partially) contained within the image; determining at least one hand portion of the image by cropping the image to a region of the detected at least one hand; determining a third likelihood value on the basis of the at least one hand portion by means of a neural network, the third likelihood value indicating whether the at least one hand cooperates with the steering element, wherein the information on whether the at least one hand cooperates with the steering element is determined in dependence of the third likelihood value.

According to another aspect a fourth likelihood value can be determined on the basis of the complete image by means of a neural network, the fourth likelihood value indicating whether the at least one hand cooperates with the steering element, wherein the information is determined in dependence of the fourth likelihood value. For example, image regions can be cropped around every detected hand in the proximity of the detected steering element location with a configurable margin. The image regions can have a rectangular shape.

The cropped image regions can be classified by a deep neural network, wherein the network can be a convolutional neural network. Its output can be a single neuron that outputs a value between 0 and 1 corresponding to a likelihood that a hand cooperates with the steering element. In another variant multiple output neurons can be provided that output a likelihood for individual hands (e.g. left hand on wheel, right hand on wheel), or likelihoods for hands touching a certain region of the steering wheel.

It is possible to use an ensemble of neural networks which implement one or more of the above variants, wherein the individual networks are preferably trained differently (e.g. on different data sets or with different parameters).

Although some of the likelihood values described further above, in particular said first, second, third, and fourth likelihood values, are presented with an index (first, second, etc.) this is merely for identification purposes and no further meaning shall be inferred from the indices, in particular no ordering of the method steps. In addition, it is emphasized that the method may also be carried out with only one said first, second, third, and fourth likelihood values. Combinations of two, three and four of the likelihood values are also possible. For some of the likelihood values, two versions can be determined, one for each of the hands.

The step of determining the information on whether the at least one hand cooperates with the steering element can comprise the following: determining a plurality of likelihood values, each of the likelihood values indicating whether the at least one hand cooperates with the steering element; and fusing of the likelihood values by means of a predetermined fusion rule. The likelihood values can comprise at least one of said first, second, third and fourth likelihood values. Preferably, at least two likelihood values are fused.

The fusion rule can generally be configured to increase the reliability of the fused output value in a statistical sense. This is to say that the likelihood values can be fused, e.g. in a data fusion module, to increase the overall robustness of the method. The fusion rule can be based on a "mixture of experts" method (see e.g. Yuksel, Wilson and Gader (2012): *Twenty years of mixture of experts* for an overview). In one example a probabilistic multiplication can be used as a predetermined fusion rule. This is, with $p_i$ being the likelihood values, i being the index, the fused overall likelihood value for determining the desired information is $p = \Pi p_i / (\Pi p_i + \Pi(1-p_i))$, wherein $\Pi$ denotes the multiplication over all i. This rule has been shown to perform particularly well on the present task. The information on whether the at least one hand cooperates with the steering element can be formed by the fused likelihood value.

The fusion rule can alternatively be configured to calculate a weighted average of the individual likelihood values. Another possibility is to combine the likelihood values using an OR logic or an AND logic. Yet another approach is to use a classifier (e.g. neural network or SVM) for obtaining the fused output based on the individual likelihood values.

It may be provided that more than one hand is detected and a likelihood value can be determined for each of the hands. For the purpose of fusion it may then be provided that the highest one of the two likelihood values is used for the fusion step. This may be sufficient if for a given vehicle control application it is only required to monitor whether one single hand cooperates with the steering element.

The result of the fusion can be outputted via a network protocol that is used by other systems of the vehicle, in particular the systems which require the desired information as input. However, other ways of distributing the information can also be realized.

The methods disclosed herein can be used alone, i.e. without sharing further information from other sensors. However, the information can also be fused with signals acquired by means of classical touch/pressure/torque sensor-based systems in order to increase the overall reliability of the information even further.

In one embodiment a first portion of the likelihood values is determined on the basis of the complete image and/or portions thereof by means of at least one neural network, and wherein a second portion of the likelihood values is determined on the basis of at least one difference value representing a distance between the steering element and the at least one hand.

According to another aspect a data processing unit is provided for determining an information on whether at least one hand of a vehicle driver cooperates with a manual steering element of a vehicle, wherein the processing unit is configured to carry out the method according to one of the embodiments disclosed herein. The processing unit can be configured as a data processing unit and may comprise at least one memory unit and at least one non-transitory data storage. The non-transitory data storage and/or the memory unit may comprise a computer program for instructing the computer to perform several or all steps or aspects of the computer implemented method described herein.

According to another aspect a system with said data processing unit is provided, wherein the system comprises at least one sensor configured to take at least one image that captures at least one steering element of a vehicle. The at least one sensor can be configured to provide three-dimensional image data for the at least one image, in particular wherein the at least one sensor comprises a structured light camera, a time-of-flight camera, an ultrasonic sensor, a radar sensor and/or a Lidar sensor.

According to yet another aspect a non-transitory computer readable medium is provided. The medium comprises instructions, which when executed by said processing unit, cause the processing unit to carry out the method according to one of the embodiments disclosed herein. The medium can be part of the vehicle and connected to the processing unit. The computer readable medium may be configured as: an optical medium, such as a compact disc (CD) or a digital versatile disk (DVD); a magnetic medium, such as a hard disk drive (HDD); a solid state drive (SSD); a read only memory (ROM), such as a flash memory; or the like. Furthermore, the computer readable medium may be configured as a data storage that is accessible via a data connection, such as an internet connection. The computer readable medium may, for example, be an online data repository or a cloud storage.

It is understood that features described in connection with the method can be realized in the device as well as the system and vice versa.

DRAWINGS

Exemplary embodiments and functions of the present disclosure will be described in more detail in the following with reference to the drawings showing in:

FIG. 2b a schematic illustration of aspects of FIG. 2a;

DETAILED DESCRIPTION

In the figures, the same or corresponding parts are indicated with the same reference signs.

Figure 1:
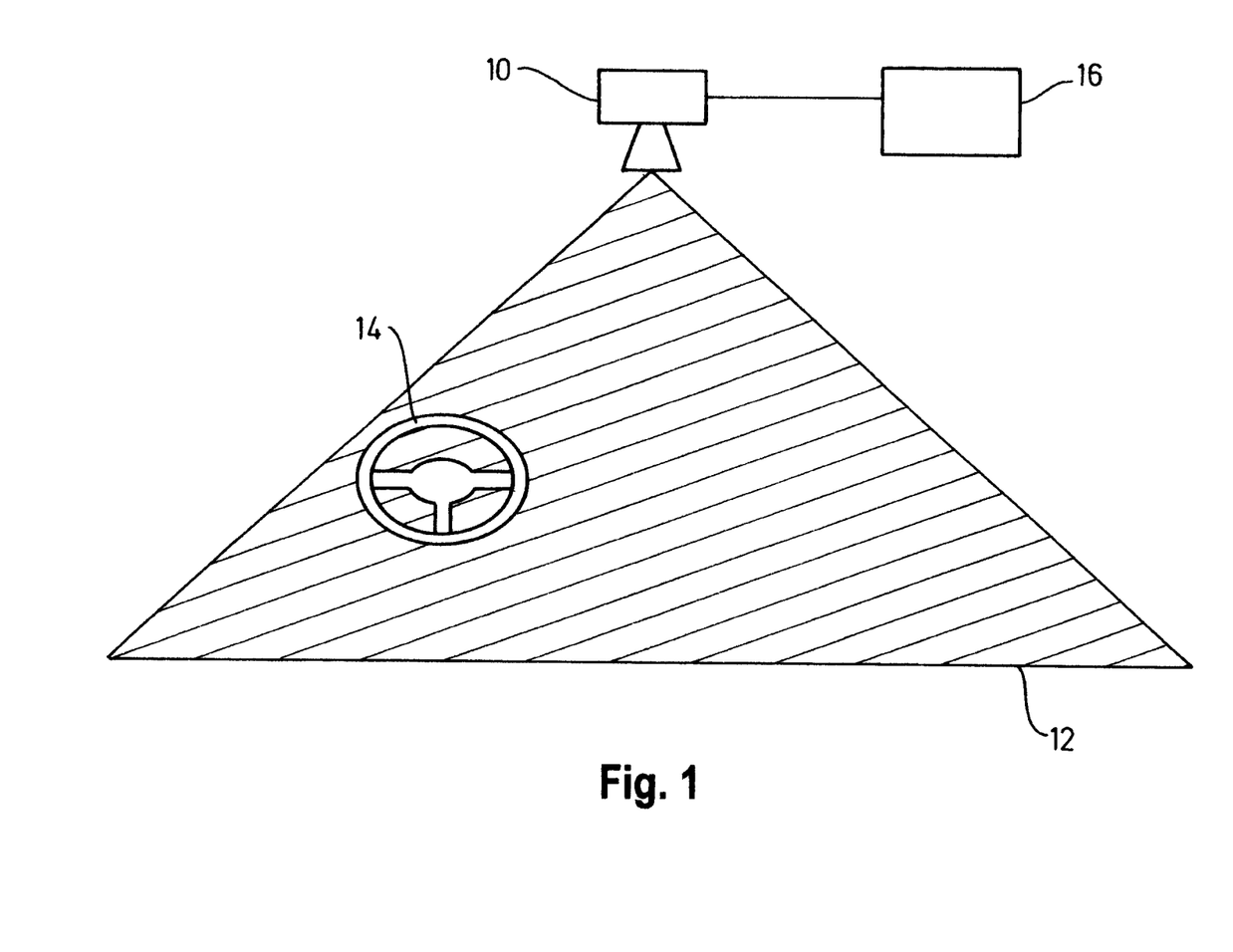
FIG. 1 a schematic illustration of a system for determining an information on whether a hand of a vehicle driver cooperates with a steering element of a vehicle.

FIG. 1 illustrates aspects of a system for carrying out a method for determining an information on whether a hand of a vehicle driver cooperates with a steering element of a vehicle. A sensor 10 is mounted on a vehicle (not shown) such that a field of view 12 of the sensor 10 captures a steering wheel 14 of the vehicle. The sensor can be mounted inside a passenger cabin of the vehicle (not shown), for example at the inside of a roof of the cabin. The sensor 10 can be a camera for taking images of the field of view 12. Therefore, each of the images taken by said sensor 10 includes the steering wheel 14. Preferably, the sensor 10 is arranged such that the steering wheel 14 is always contained in the images taken by the sensor 10. Therefore, adjustments of a steering wheel column do not lead a displacement of the steering wheel beyond the field of view 12.

The sensor 12 is connected to a processing unit 16, which is configured to carry out a computer implemented method for determining an information on whether at least one hand of a vehicle driver (not shown) is cooperating with the steering wheel 14. This will be described in greater detail in the following.

Figure 2A:
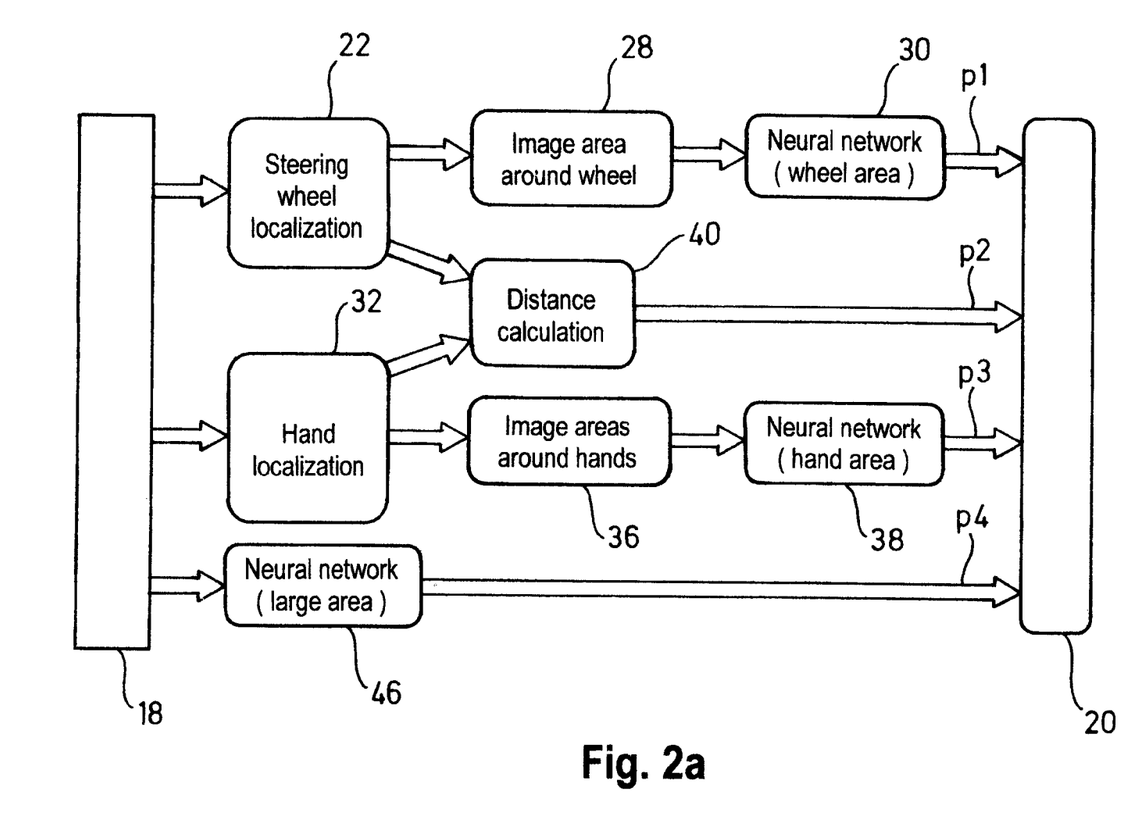
FIG. 2a a schematic overview of a method for determining an information on whether a hand of a vehicle driver cooperates with a steering element of a vehicle.

FIG. 2a shows a schematic overview of a method for determining an information on whether a hand of a vehicle driver cooperates with a steering element of a vehicle. The method begins with taking an image 18 by means of the sensor 10. The image 18 is then processed by means of the processing unit 16 in order to arrive at a plurality of likelihood values p1, p2, p3, and p4, each of the likelihood values representing a probability that at least one hand of the vehicle driver cooperates with the steering wheel 14. The likelihood values p1, p2, p3, and p4 are then subject to a fusion step 20, which will be addressed further below.

Figure 2B:
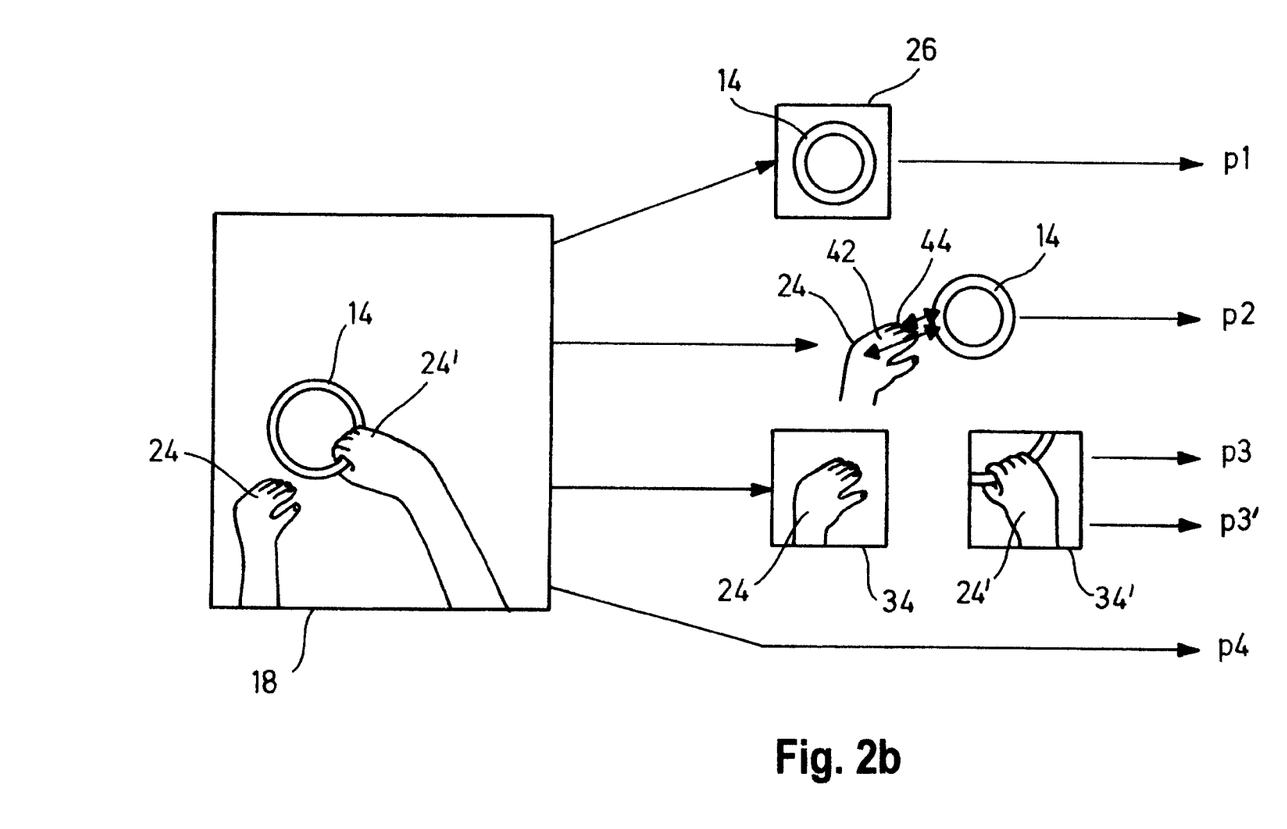

In one aspect of the method the steering wheel 14 is detected within the image 18 in step 22. In FIG. 2b the image 18 is schematically shown with two hands 24, 24' of the vehicle driver, wherein one of the hands 24 is positioned in close proximity to the steering wheel 14 and the other one of the hands 24' is grabbing the steering wheel 14. On the basis of the detected steering wheel 14 an image portion 26 is then determined in step 28 by cropping the image 18 to the steering wheel 14 including a margin around the steering wheel 14, cf. FIGS. 2a and 2b.

The steering wheel portion 26 is then processed further by a neural network in step 30 in order to obtain the likelihood value p1.

In another aspect of the method one or more hands 24, 24' of the vehicle driver are detected in step 32. Hand portions 34, 34' are then determined in step 36 by cropping the image 18 to the hands 24, 24'. Each of hand portions 34, 34' is then processed by means of another neural network step 38. The output is a likelihood value p3, p3' for each of the image portions 34, 34'.

In another aspect of method at least one distance measure is determined in step 40. In one example a plurality of 3D-positions are determined for each of the detected hands 24, 24', wherein the 3D positions can be for example a center position 42 and a fingertip position 44 as illustrated in FIG. 2B. For each of the positions 42, 44 the distance to the steering wheel 14 is evaluated. The minimum distance between the positions 42, 44 steering wheel 14 is then mapped to the likelihood value p2.

Another aspect of the method is that the complete image 18 is processed by means of another neural network in step 46 in order to obtain the likelihood value p4.

Further details of the method steps are described in the following.

In view of step 22, the steering wheel 14 can be localized within the image 18 by using a particle filter approach. In particular, the 3D position and orientation of the steering wheel 14 can be determined based on amplitude and depth data of the image 18, wherein the sensor 10 can be a time-of-flight camera mounted inside the vehicle. This is to say that the image 18 comprises three-dimensional image data. Alternatively, 2D-image data can be used.

As an initial step for localizing the steering wheel 14 a fixed number of samples for the position and orientation of the steering wheel 14 are drawn uniformly (or according to normal distributions centered at the last known position(s) of the steering wheel 14 or at the center of the range of possible positions of the steering wheel 14) at random within a predefined search space. In a first iteration, a rating function is calculated for each of the samples, wherein the rating function quantifies the accordance, i.e. match of the sample with the depth values of the image 18. This can be done by generating sample points for a model, namely an elliptical torus model 50 of the steering wheel 14 (cf. FIG. 3), the torus model 50 being positioned according to the sample. Corresponding sample pixels of the image are then identified and the rating function is computed on the basis of the pixel values of the sample pixels. More details of this step will be addressed further below.

For the next iteration, new samples are drawn from the samples of the first iteration with a probability that is proportional to the values of the rating function of the samples from the first iteration. Each or at least some of the new samples is slightly modified by adding small random values to its position and orientation. These random values are chosen from a Gaussian distribution with a standard deviation that is individually set for each dimension of the position and orientation in proportion to the size of the search space in that dimension. It is preferably enforced that the new samples stay within the search space.

Figure 3:
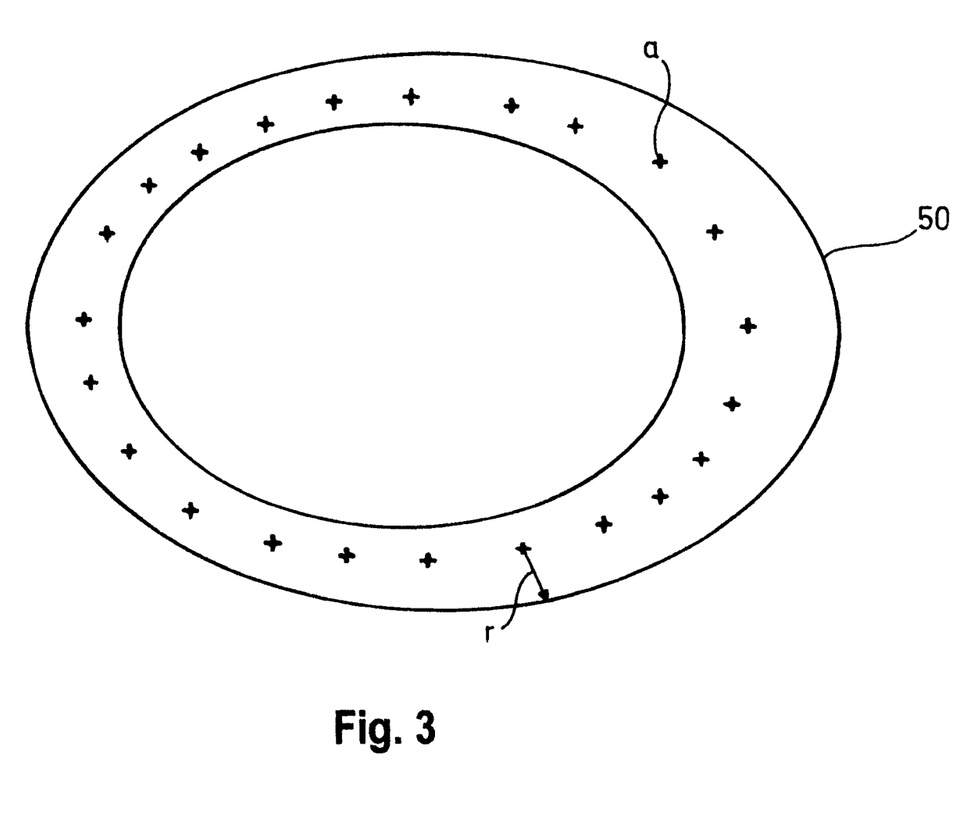
FIG. 3 a schematic illustration of a model representing a steering element in an image.

For each of the redrawn samples of the next iteration the rating function is calculated again based on the depth values of the image 18. This process is repeated iteratively in the same manner, and with each iteration the standard deviations of the added random values are slightly reduced until they are at a tenth of their start value (simulated annealing). This effectively causes the samples to concentrate around those positions and orientations where the torus model 50 appears to fit well to the image 18. To increase the focus on the best result, one percent of the new samples is not drawn at random but created from the best result of the last iteration. Here, the random values that are added only have a hundredth of the usual standard deviation. Additionally (or alternatively), samples can be set to fixed values that cover the complete search space in regular intervals or uniformly at random.

The steering wheel position can usually be modified by the driver. Therefore, there is a range of possible positions and orientations of the steering wheel 14 relative to the sensor 10. Knowledge about this range can be taken into account to constrain the search space further.

Details of the torus model 50 and the rating function are further described in the following.

The depth values of the image 18 (the depth values form a depth image) are clamped to a predetermined range and then filtered over time to reduce noise. The filtering can be carried out on the basis of a sequence of images taken at subsequent time instances. A Sobel-edge filter is applied to the filtered image. The resulting edge image is clamped to reduce the effect of outliers and to avoid overrating of very steep edges compared to moderate ones. The rating function for the sampled steering wheel positions and orientations is calculated using the depth image, the edge image, and a model of the steering wheel 14.

As also indicated further above the model is preferably an elliptical torus 50, FIG. 3, i.e. a surface consisting of all the points that have a certain distance r to an ellipse in 3D space. The length of the major and minor axis of the ellipse and the radius r are fixed and set to values that approximate the shape of the outer ring of the actual steering wheel 14 (which is known a priori). It is understood that the torus 50 is a three-dimensional geometrical model positioned in a three-dimensional space although FIG. 3 shows the torus 50 only in two dimensions.

For a given sample (position and orientation) of the model 50 a plurality of points (i.e. sample points) are determined for the purpose of evaluating the rating function for the respective sample. Each of the points is associated with a depth value. Due to the position and orientation of the model 50 the model 50 has a shape that depends on the perspective of the sensor 10. An example of such a shape is illustrated by the torus 50 of FIG. 3.

Figure 4:
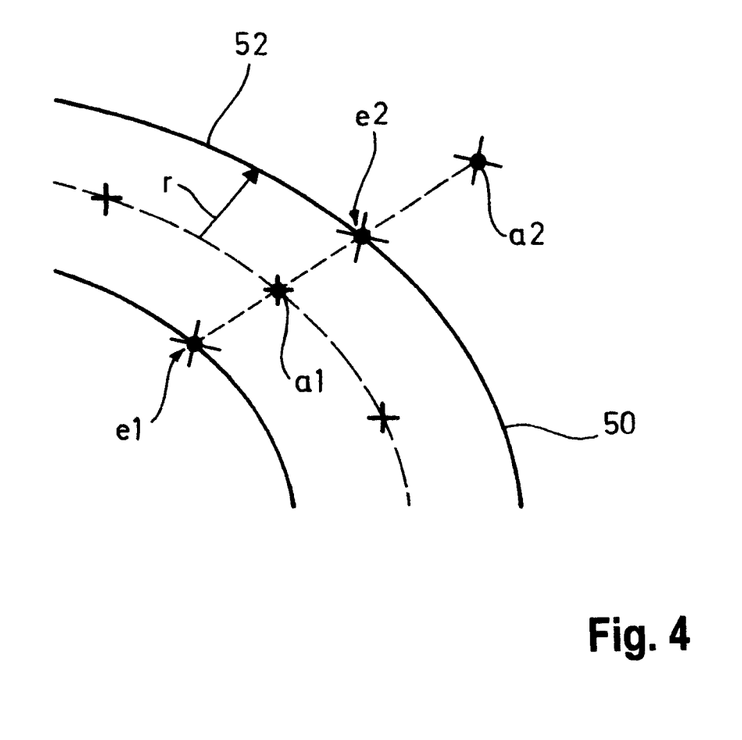
FIG. 4 a schematic illustration of a portion of the model of FIG. 3.

A fixed number of points a is sampled from the 3D ellipse spanning the torus 50 (cf. FIG. 3). For each or at least some of these points a, the local direction of the ellipse is approximated by subtracting its direct neighbours. For a given sample point a1 of the points a, cf. FIG. 4 showing a portion of the torus 50 of FIG. 3, two points e1 and e2 are determined that lie on the edge 52 of the torus 50 as seen from the point of view of the sensor 10. The direction from a1 to the edge 52 is given by the cross product of the local direction of the ellipsis with the direction from the sensor 10 position to a1. By moving along that direction, starting at a1, over a distance of the torus radius r into both directions, the two edge points e1 and e2 are obtained. Following that direction further than r into the direction that leads away from the center of the ellipse, a point a2 outside the torus is calculated.

For a given sample position and orientation for the torus 50 the 3D positions of the said sample points a, are calculated, and with them their respective edge points e1, e2 and points a2 outside the torus 50, as shown in an exemplary manner in FIG. 4 for the point a1. All or at least some of the points are then projected from 3D coordinates to pixel coordinates of the depth image using a predetermined transformation rule. The transformation rule can be based on intrinsic parameters of the sensor 10, i.e. prior knowledge about the spatial relationship between 3D points in the field of view of the sensor 10 and the resulting pixel information of the image 18 can be available.

Using the depth image, for each point on the model 50 (i.e. points a, a1) and its corresponding points outside the model 50 (a2), their depth values are subtracted, i.e. a2−a1. The resulting depth differences can be clamped to a predefined range of values, e.g. a range between zero and a fixed value, in order to prevent an overly strong influence of implausible depth differences. This is because it can be assumed that the steering wheel 14 is closer to the sensor 10 than the background around the steering wheel 14 except possibly the hands 24 24' and arms of the driver.

The rating function can have two components, (i) the sum of the depth differences for all sample points (i.e. a2−a1 for all a) and (ii) the sum of the edge values of the edge image for all sample positions (i.e. e1+e2 for all a). Both components can then be added with weights. The result can be normalized and subjected to the exponential function so as to obtain the final result of the rating function for the respective sample location (i.e., the sample position and orientation of the model 50).

For at least some of the possible sample locations of the model 50 the rating function is computed as set forth above. The different results of the rating function are then compared in order to localize the steering wheel 14. For example, the maximum of the different results can be chosen and the respective position and orientation of the model 50 is the location of the steering wheel 14. Alternatively, a weighted or unweighted average of the different results or a subset of thereof with a high rating (above a threshold) can be determined and used to determine the position and orientation of the model 50 matching with the steering wheel 14. It is understood that the rating function can also be formulated in a way that the minimum of the different results of the rating function indicates the location of the steering wheel 14.

The individual likelihood values p1, p2, p3, and p4 can be fused in step 20 by applying a fusion rule. The fusion rule can be configured to output a fused likelihood value p on the basis of the individual likelihood values p1, p2, p3, p4, wherein the fused likelihood value is an information on whether one or both of the hands 24, 24' cooperate with the steering wheel 14. The fusion rule can comprise a formula that can be expressed as: $p=\Pi pi/(\Pi pi+\Pi(1-pi))$, wherein $p_i$ are the individual likelihood values for i={1, 2, 3, 4} and Π denotes the product over all i.

The invention claimed is:

1. A computer-implemented method for determining whether at least one hand of a vehicle driver cooperates with a manual steering element of a vehicle, the method comprising:
   taking at least one image using at least one sensor mounted on the vehicle, the at least one image capturing at least the manual steering element of the vehicle, the at least one image comprising three-dimensional image data; and
   determining, based on the at least one image, information on whether the at least one hand of the vehicle driver cooperates with the manual steering element by:
      detecting the manual steering element within the at least one image, the detected manual steering element being represented by a model of the manual steering element, the model having at least one of: a position or orientation matching with a position or orientation of the manual steering element in the vehicle, the detecting comprising determining the at least one of the position or orientation of the model using a matching algorithm that comprises at least one of: a particle filter or a grid-search algorithm;
      detecting the at least one hand within the at least one image when the at least one hand is included in the at least one image;
      determining a steering element portion of the at least one image by cropping the at least one image to a region that includes the detected manual steering element;
      determining a distance between the detected manual steering element and the detected at least one hand;
      determining, based on the distance, a first likelihood value that indicates whether the at least one hand cooperates with the manual steering element; and
      determining a second likelihood value based on the steering element portion and using a neural network, the second likelihood value indicating whether the at least one hand cooperates with the manual steering element.

2. The method of claim 1, wherein the at least one sensor comprises at least one of a structured light camera, a time-of-flight camera, an ultrasonic sensor, a radar sensor, or a Lidar sensor.

3. The method of claim 1, wherein the detected at least one hand is represented by a plurality of positions of the at least one hand within the vehicle, and
   wherein the plurality of positions are associated with characteristic portions of the at least one hand.

4. The method of claim 3, wherein detecting the at least one hand comprises:
   determining at least one hand region within the at least one image by comparing the at least one image with a reference image, wherein the at least one hand region represents a portion of the at least one image which is expected to include an image of the at least one hand;
detecting the at least one hand based on the hand region and using a classifier;
determining the plurality of positions for the at least one hand.

5. The method of claim 1, wherein determining the distance comprises:
determining a minimum distance between the detected manual steering element and the detected at least one hand; and
determining the first likelihood value in dependence on the minimum distance and a threshold.

6. The method of claim 1, comprising:
determining at least one hand portion of the at least one image by cropping the at least one image to a region that includes the detected at least one hand;
determining a third likelihood value based on the determined at least one hand portion and using the neural network, the third likelihood value indicating whether the at least one hand cooperates with the manual steering element, wherein the information is determined based upon the third likelihood value.

7. The method of claim 6, comprising:
determining a fourth likelihood value based on all of the at least one image and using the neural network, the fourth likelihood value indicating whether the at least one hand cooperates with the manual steering element, wherein the information is determined based upon the fourth likelihood value.

8. The method of claim 1, wherein determining the information comprises:
determining a plurality of likelihood values, each of the likelihood values indicating whether the at least one hand cooperates with the manual steering element, the plurality of likelihood values including the first likelihood value and the second likelihood value; and
fusing the plurality of likelihood values using a predetermined fusion rule.

9. The method of claim 8, further comprising:
determining a first portion of the plurality of likelihood values based on at least portions of the at least one image using at least one neural network, and
determining a second portion of the plurality of likelihood values is based on at least one difference value representing a distance between the detected manual steering element and the detected at least one hand.

10. A system comprising:
a data processing unit;
at least one sensor mounted on a vehicle; and
a non-transitory computer readable medium comprising processor-executable instructions that, responsive to execution by the data processing unit, direct the system to perform a method comprising:
taking at least one image using the at least one sensor mounted on the vehicle, the at least one image capturing at least a manual steering element of the vehicle, the at least one image comprising three-dimensional image data;
determining, based on the at least one image, information on whether at least one hand of a vehicle driver cooperates with the manual steering element by:
detecting the manual steering element within the at least one image, the detected manual steering element being represented by a model of the manual steering element, the model having at least one of: a position or orientation matching with a position or orientation of the manual steering element in the vehicle, the detecting comprising determining the at least one of the position or orientation of the model using a matching algorithm that comprises at least one of: a particle filter or a grid-search algorithm;
detecting the at least one hand within the at least one image when the at least one hand is included in the at least one image;
determining a steering element portion of the at least one image by cropping the at least one image to a region that includes the detected manual steering element;
determining a distance between the detected manual steering element and the detected at least one hand;
determining, based on the distance, a first likelihood value that indicates whether the at least one hand cooperates with the manual steering element; and
determining a second likelihood value based on the steering element portion and using a neural network, the second likelihood value indicating whether the at least one hand cooperates with the manual steering element.

11. The system of claim 10, the method further comprising:
determining at least one hand portion of the at least one image by cropping the at least one image to a region that includes the detected at least one hand;
determining a third likelihood value based on the determined at least one hand portion and using the neural network, the third likelihood value indicating whether the at least one hand cooperates with the manual steering element, wherein the information is determined based upon the third likelihood value.

12. The system of claim 11, the method further comprising:
determining a fourth likelihood value based on all of the at least one image and using the neural network, the fourth likelihood value indicating whether the at least one hand cooperates with the manual steering element, wherein the information is determined based upon the fourth likelihood value.

13. The system of claim 10, wherein determining the information comprises:
determining a plurality of likelihood values, each of the likelihood values indicating whether the at least one hand cooperates with the manual steering element, the plurality of likelihood values including the first likelihood value and the second likelihood value; and
fusing the plurality of likelihood values using a predetermined fusion rule.

14. The system of claim 10, wherein the detected at least one hand is represented by a plurality of positions of the at least one hand within the vehicle, and
wherein the plurality of positions are associated with characteristic portions of the at least one hand.

15. The method of claim 14, wherein detecting the at least one hand comprises:
determining at least one hand region within the at least one image by comparing the at least one image with a reference image, wherein the at least one hand region represents a portion of the at least one image which is expected to include an image of the at least one hand;
detecting the at least one hand based on the hand region and using a classifier;

determining the plurality of positions for the at least one hand.

16. A non-transitory computer readable medium comprising processor-executable instructions that, responsive to execution by one or more processors, direct a system to perform operations comprising:
  taking at least one image using at least one sensor mounted on a vehicle, the at least one image capturing at least a manual steering element of the vehicle, the at least one image comprising three-dimensional image data;
  determining, based on the at least one image, information on whether at least one hand of a vehicle driver cooperates with the manual steering element by:
    detecting the manual steering element within the at least one image, the detected manual steering element being represented by a model of the manual steering element, the model having at least one of: a position or an orientation matching with a position or orientation of the manual steering element in the vehicle, the detecting comprising determining the at least one of the position or orientation of the model using a matching algorithm that comprises at least one of: a particle filter or a grid-search algorithm;
    detecting the at least one hand within the at least one image when the at least one hand is included in the at least one image;
    determining a steering element portion of the at least one image by cropping the at least one image to a region that includes the detected manual steering element;
    determining a distance between the detected manual steering element and the detected at least one hand;
    determining, based on the distance, a first likelihood value that indicates whether the at least one hand cooperates with the manual steering element; and
    determining a second likelihood value based on the steering element portion and using a neural network, the second likelihood value indicating whether the at least one hand cooperates with the manual steering element.

17. The non-transitory computer readable medium of claim 16 comprising processor-executable instructions that, responsive to execution by the one or more processors, further direct the system to perform operations comprising:
  determining at least one hand portion of the at least one image by cropping the at least one image to a region that includes the detected at least one hand;
  determining a third likelihood value based on the determined at least one hand portion and using the neural network, the third likelihood value indicating whether the at least one hand cooperates with the manual steering element, wherein the information is determined based upon the third likelihood value.

18. The non-transitory computer readable medium of claim 17 comprising processor-executable instructions that, responsive to execution by the one or more processors, further direct the system to perform operations comprising:
  determining a fourth likelihood value based on all of the at least one image and using the neural network, the fourth likelihood value indicating whether the at least one hand cooperates with the manual steering element, wherein the information is determined based upon the fourth likelihood value.

19. The non-transitory computer readable medium of claim 16 comprising processor-executable instructions that, responsive to execution by the one or more processors, further direct the system to perform operations comprising:
  determining a plurality of likelihood values, each of the likelihood values indicating whether the at least one hand cooperates with the manual steering element, the plurality of likelihood values including the first likelihood value and the second likelihood value; and
  fusing the plurality of likelihood values using a predetermined fusion rule.

20. The non-transitory computer readable medium of claim 16 comprising processor-executable instructions that, responsive to execution by the one or more processors, further direct the system to perform operations comprising:
  determining at least one hand region within the at least one image by comparing the at least one image with a reference image, wherein the at least one hand region represents a portion of the at least one image which is expected to include an image of the at least one hand;
  detecting the at least one hand based on the hand region and using a classifier;
  determining, as detected at least one hand, a plurality of positions for the at least one hand.

* * * * *